Jan. 3, 1933.   C. A. G. STANDAGE   1,893,452
FLEXIBLE SHAFT COUPLING FOR THE TRANSMISSION OF POWER
Filed Nov. 1, 1930   3 Sheets-Sheet 1
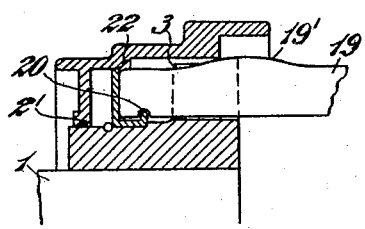
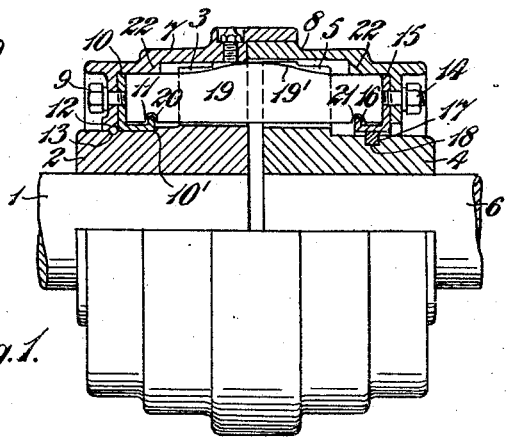
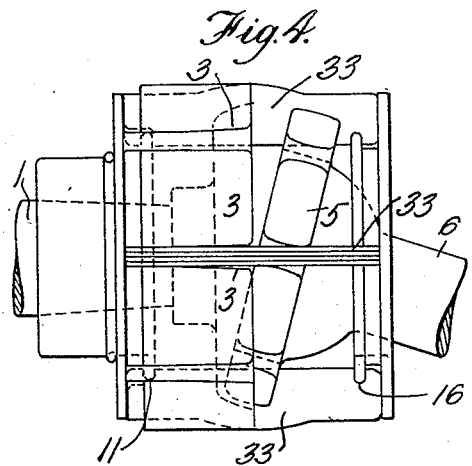
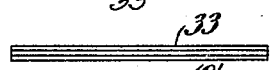
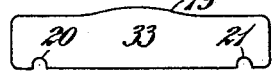
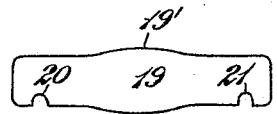
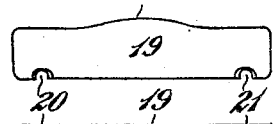
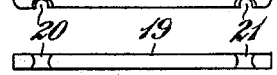
INVENTOR
Charles A. G. Standage
BY
ATTORNEY

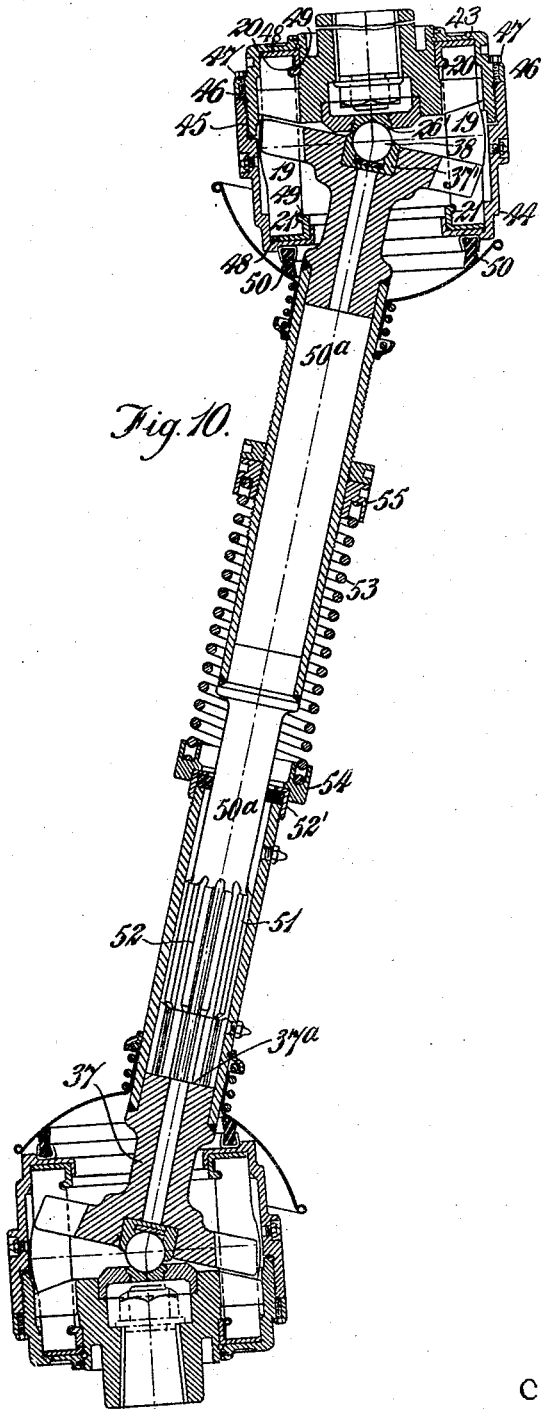

Jan. 3, 1933.   C. A. G. STANDAGE   1,893,452
FLEXIBLE SHAFT COUPLING FOR THE TRANSMISSION OF POWER
Filed Nov. 1, 1930   3 Sheets-Sheet 3
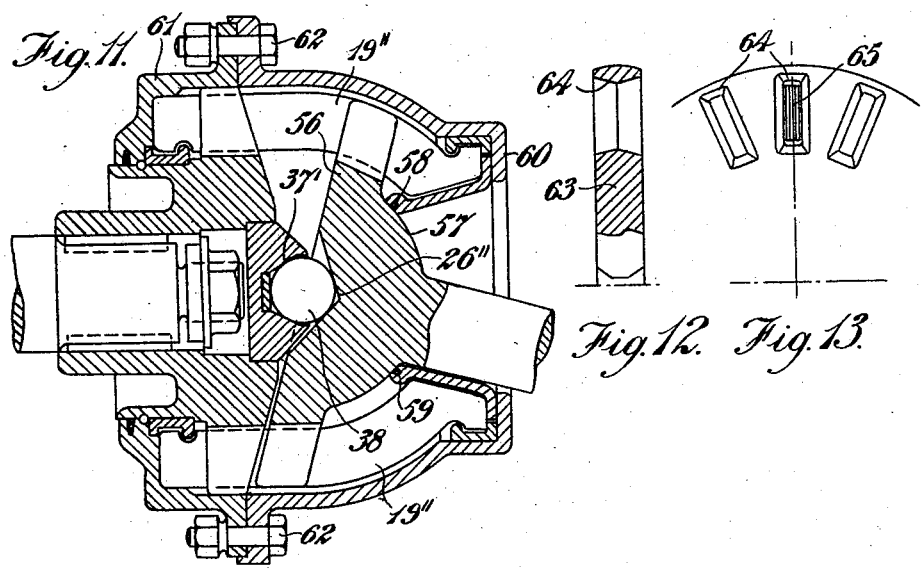
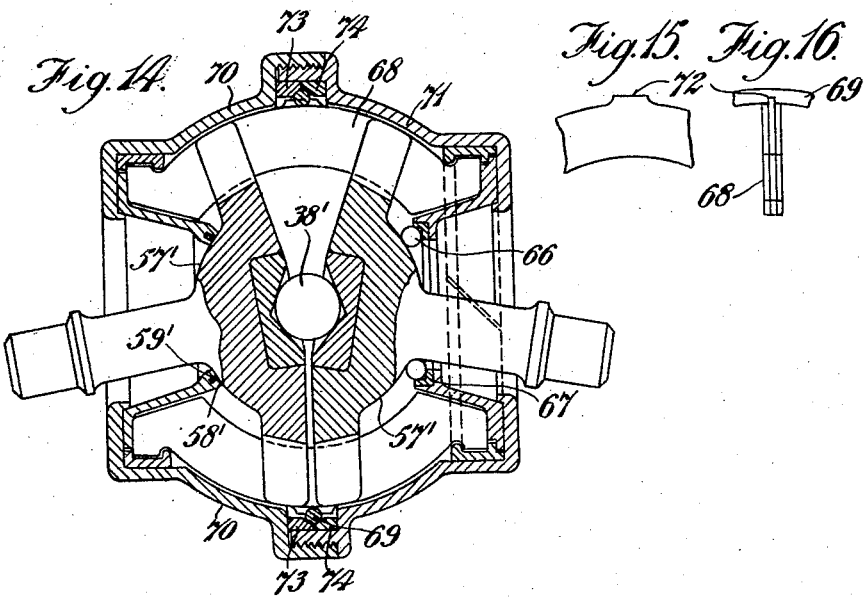
INVENTOR
Charles A. G. Standage
BY
ATTORNEY Patented Jan. 3, 1933

1,893,452

UNITED STATES PATENT OFFICE

CHARLES ARTHUR GLENDOWER STANDAGE, OF LONDON, ENGLAND

FLEXIBLE SHAFT COUPLING FOR THE TRANSMISSION OF POWER

Application filed November 1, 1930, Serial No. 492,795, and in Great Britain November 9, 1929.

This invention relates to flexible couplings for the transmission of power, for example flexible couplings for use as universal joints in Cardan shafts, of the kind wherein the two shafts to be coupled are provided with coupling members each having a series of peripheral teeth, the power being transmitted from one of such coupling members to the other by means of a series of springs each extending from a tooth space in one coupling member to a tooth space in the other coupling member, and my said invention has for its object to provide means whereby springs of a simple and durable form are supported relatively to the said coupling members.

It has moreover been suggested, in connection with machine shaft couplings of the kind comprising gridlike resilient interconnecting members, the limbs of which bridge and lie removably in axially directed grooves or tooth spaces in the periphery of the coupling members and are surrounded by a casing or shell, to secure the casing or shell entirely to only one of the said peripherally grooved coupling members.

According to my invention the springs, which may be either solid or laminated, are separate from one another and are supported in a casing or housing that is advantageously mounted on one of the coupling members, are provided with transverse slots that engage with flanges or annular ribs arranged in the casing or housing so as to prevent or reduce to a given limiting value the endwise movement of the springs. By this means free pivotal movement of the springs about their places of engagement with said flanges or ribs is also possible during the flexing of the springs in the transmission of power. Furthermore, more especially by forming one of the flanges or annular ribs on a ring and keeping such ring in position between a shoulder and a split ring on the hub of one of the coupling members, end knock is eliminated.

According to another feature of the invention, the springs are provided with convex extensions on one or both sides, so as to increase their strength at the parts where the stress thereon is the greatest. Furthermore by thus causing the springs to taper from the middle part towards each end, their flexibility is materially increased.

By my said invention I am enabled to increase materially the angle through which the driving and driven shafts and their attached coupling members can be turned relatively to one another as compared with the flexible couplings of the kind heretofore in use, this being rendered possible by reason of the normal stressing of the springs due to the transmission of the power not being materially increased by the coupling members being brought out of alignment with one another. A flexible coupling is thus obtained which enables a constant velocity ratio between the driving and driven shafts to be maintained throughout the revolution of the coupling even when the driving and driven shafts are at an angle to one another, so that a very uniform drive of the driven parts is obtained and wear of the elements of the moving system reduced to a minimum. Moreover constant changing of the angle between the driving and the driven shafts, as in the case of automobile transmission-mechanism has no detrimental effect upon the coupling.

My said invention comprises various detail improvements hereinafter described.

In the accompanying drawings I have shown how my said invention may be conveniently and advantageously carried into practice, viz:

Figure 1 is an elevation partly in section of one form of coupling,

Figure 2 is a view showing part of Figure 1, illustrating the small amount of lateral movement of the casing necessary during the placing of the spring elements in position.

Figure 3 is an elevation partly in section of another form of coupling.

Figure 4 is a view of the operative parts of a coupling of a type wherein provision is made for the driving and driven shafts operating at an angle to one another, two laminated springs being shown in elevation and one in edge view.

Figure 5 is an edge view and

Figure 6 an elevation of a laminated spring shown separately.

Figure 7 is an elevation of a modified form of spring.

Figure 8 is an elevation and

Figure 9 an underside view of an unlaminated spring.

Figure 10 shows a Cardan shaft fitted with two flexible couplings constructed according to my said invention.

Figure 11 is a longitudinal section of a further form of coupling.

Figures 12 and 13 are detail views illustrating a modified construction of coupling member.

Figure 14 is a longitudinal section of a still further form of coupling, and

Figures 15 and 16 are detail views of a constructional feature of the coupling shown in Figure 14.

As shown in Figure 1, a driving shaft 1 has mounted thereon a coupling member 2 provided with teeth 3. A second coupling member 4 provided with teeth 5 is secured upon a driven shaft 6. A casing is arranged around the coupling members and comprises two parts 7, 8, which may advantageously fit one on the other by means of a socket and spigot joint as shown. The part 7 of the casing is secured by studs 9 to a ring 10 which is provided with an annular rib or flange 11. This ring abuts at its inner face 10' against a shoulder on the hub of the coupling member 2 and is held in position on such coupling member by a sectional or split ring 12 that is introduced into an annular groove 13 in the coupling member 2 and is retained in such groove by fitting against the inner wall 2' of an annular recess in the bore of the casing member 7. The second part 8 of the casing has secured thereto by studs 14, a ring 15 provided with an annular rib or flange 16. A packing ring 17 housed in a groove 18 in the hub of the coupling member 4 extends into contact with the ring 15 and thus prevents the escape through the annular gap between the ring 15 and the coupling member 4 of any suitable lubricant contained in the space surrounding the teeth 3, 5.

The springs 19, which act as interconnecting members between the coupling members 2, 4, rest in spaces that are substantially in register and are formed respectively between adjacent teeth 3 and adjacent teeth 5. Each spring is provided in its inner edge near the ends thereof with slots 20, 21, which respectively engage the annular ribs 11 and 16 on the rings 10, 15, a suitable amount of clearance being provided in the said slots. By this means, the endwise movement of the springs is limited as required and the two parts 7 and 8 of the casing are simultaneously held together. Rotation of the shaft 1 and coupling member 2 is transmitted by the springs 19 to the coupling member 4 and the shaft 6, the springs by such transmission being flexed according to the load exerted thereon, the elasticity of such springs eliminating shocks caused by irregular transmission and the like, preventing undue wear and breakage of shafts and gears, compensating for malalignment of shafts and lessening the wear on the shaft bearings. At the same time the driven shaft 6 may move freely through a short distance axially relatively to the driving shaft 1.

The springs 19 shown in Figures 1 and 2 are provided in the middle with convex extensions 19', so as to increase their strength at the place where the bending stress is greatest. In this case the convex extensions are on the outer sides of the springs, they may however be on the inner sides of the springs, or on both the inner and outer sides of the springs as shown in Figure 7. In Figures 5 and 6, the springs 33 are shown made of laminæ, which are capable of moving relatively to one another as they are flexed in the rotation of the coupling, more especially when the driving and driven shafts are not in alignment with one another. The laminæ may be of any suitable number according to the load transmitted. In cases where thicker unlaminated springs are employed, the slots 20, 21 are flared at both sides, e. g. as shown in Figures 8 and 9, so as to permit the requisite lateral pivotal movement of the springs about their places of engagement with the flanges or annular ribs in the casing, in addition to affording a limited amount of endwise movement.

In Figure 14 a spring is shown in which the outer edge is formed wholly in a convex curve the inner edge being concave.

The spring may be advantageously die-stamped from uniform high-tensile-steel suitably tempered after stamping.

The inner parts of the casing members 7, 8 have conical surfaces 22, 22 which by bearing against the outer corners of the springs 19 facilitate the assembling of the coupling when the said casing members are slid into position with the spigot portion of the member 8 fitting into the socket portion of the member 7.

Figure 3 shows a modified form of coupling particularly intended for use with Cardan shafts or the like where the driven shaft is liable to be at a considerable angle to the driving shaft. In this form of coupling the casing is here shown made of three parts, viz. a central ring 23 provided with an annular rib 24 and having its inner surface curved to clear the convex middle parts of the driving springs, a cap member 25 fitting on a toothed coupling member 26, and a second cap member 27 that is secured to the central ring 23 by screws 28. A ring 29 provided with an annular rib 30 is secured upon the coupling member 26 by means of a sectional or split ring 31 fitting into an annular groove in the coupling member 26 as in the coupling shown in Figures 1 and 2. The cap member 25 is secured to the ring 29 by means of the screws 32. Springs 33 having convex extensions 19' on their outer edges, are provided with slots 34, 35 respectively formed in the inner and the outer edges thereof and adapted to engage the annular ribs 30, 24, and thus retain the parts of the casing in their assembled positions. The said springs rest in the spaces between the teeth on the toothed coupling member 26 and the toothed coupling member 37.

The inner part of the cap member 25 has a conical surface 36 which is adapted to depress the corresponding ends of the springs 33 and bring the recesses 34 at the lower sides of the springs on to the flange or annular rib 30 on the ring 29 on the coupling member 26, as the cap 25 is slid on to the said coupling member. The springs then tilt about on one edge or end of the roots of the corresponding tooth spaces of the other coupling member 37, the recesses 35 in the upper edges of the other ends of the springs then moving into engagement with the flange or rib 24 on the inner surface of the central ring 23.

The coupling member 37 is pivotally movable about a ball and socket joint formed by a steel ball 38 fitting into a cup 37' formed in said coupling member and into a cup 26' in the coupling member 26, the said ball and cups guiding the coupling member during its movement about the said steel ball 38. Suitable means, such as a spring-pressed axially movable section of either the driving or the driven shaft, serves to hold the ball 38 and cups in engagement with one another, for example as hereinafter described with reference to Figure 10. By this means the shafts are free to move into angular positions relatively to one another without setting up injurious stresses. Furthermore angular movement of the shafts relatively to one another is provided for by making one, e. g. 39. or both of the opposite faces of the coupling members conical and by suitably inclining the tooth spaces or slots in the coupling member 37, e. g. as shown in Figure 3.

The outer end of the member 27 of the casing is advantageously made in the form of a segment of a sphere against which bears a cap 40 of corresponding shape, that is secured on the coupling member 37 or on the shaft (not shown) on which the said coupling member is mounted, and is pressed towards the coupling member 27 by means of a spring 41. The casing member 27 has around its outer surface an annular groove in which a packing 42 of felt or other material capable of absorbing or containing lubricant is placed. The tooth spaces of the coupling members are preferably tapered or flared in the directions away from the juxtaposed surfaces of the coupling members, or formed as shown in Figure 4, so as to reduce the stresses on the springs 33 during the relative angular movement of the coupling members. By suitably shaping the faces of the teeth, they may remain in contact with the surfaces of the springs during angular movement of the driving and driven shafts, relatively to one another without its being necessary to flex the springs when no power is being transmitted by the coupling. If desired, however the teeth may be of circular, elliptical or like cross-section, e. g. in the form of truncated cones, and may be produced by drop stamping or in any suitable manner. By making the faces of the teeth curved or tapered the interconnecting springs are moved into contact with a larger area of the said teeth as the angle to which the springs are flexed varies during the transmission of movement from one to another of the toothed coupling members.

Figure 10 shows a Cardan shaft having one of my improved flexible couplings arranged at each end. In this case the casing members 43, 44 are screwed one into the other as at 45, a flange 46 being provided on the member 43 against which the end of the tubular part of the member 44 abuts when screwed home. Set screws 47, 47 are also provided in the flange 46 for engaging with the end face of the tubular part of the member 44, so as to prevent accidental unscrewing of the casings when the couplings are in use. The flexible couplings are otherwise substantially as hereinbefore described with reference to Figures 1, 2 and 3, the springs 19, 19 being retained in position by rings 48, 48 having ribs 49, 49 engaging the notches 20, 21 therein. In this case, packing strips 50, 50 are arranged in grooves in the tubular parts of the outer members 44 of the casings 43, 44 to prevent escape of the lubricant.

The balls 38, 38 are retained in their respective sockets by making the intermediate section of shafting in two parts 50a, 51, of which the part 50a is provided with splines 52, 52 adapted to slide in grooves in the interior of the section 51, which is provided with a stuffing box 52' to prevent escape of the lubricant, and by providing a spring 53 between a collar 54 on the shaft section 51 and an adjustable collar 55 on the shaft section 50a, so as to cause the divided shaft to exert outward pressure at its ends. If desired the external spring 53 may be replaced by a spring arranged in the tubular shaft 51 between the end of the shaft section 50a and the end face 37a of the adjacent coupling member 37.

If desired the section 50a of the telescopic shaft may have a longitudinal hole so as to permit movement of the lubricant from one to the other part of the system.

In the arrangement shown in Figure 11, the coupling member 56 is provided with a convex outer surface 57 in the form of a segment of a sphere, such surface engaging with an annular guide 58 which has a packing ring 59 in its operative surface and is secured in the outer member 60 of the casing, the members 60 and 61 of which are held together by bolts 62. By this means the ball 38 is held positively in its sockets 26" and 37'. The springs 19" are made with their right hand parts concentric with the ball 38.

Figures 12 and 13 illustrate a still further modification, in which one of the coupling members 63 has its teeth shrouded as shown at 64, so as to increase their strength and to retain the springs 65 more efficiently in position.

Figures 14, 15 and 16 show a still further modification, in which both of the coupling members are provided with spherical surfaces 57'. These surfaces may either engage with guide rings such as 58' having packing strips 59' as shown on the left hand side of this figure, or they may engage with a series of balls 66 arranged in a ball race 67, so as to reduce friction to a minimum. In such case the springs 68 may be provided with a spacing ring 69 secured between the members 70, 71 of the casing and having transverse grooves to receive lugs 72 on the middle members of the laminated springs 68, so as to hold the said springs accurately in the required positions. The spacing ring 69 is held in position by means of two rings 73, 74 having conical surfaces for engaging the ring 69. In some cases it may be advantageous to make the spacing ring 69 split or divided. In this case the springs 68 are made concentric with the ball pivot 38'.

If desired spherical caps, such as those shown at 40 in Figure 3 may be provided to engage with packing rings on the ends of the casings in Figures 11 and 14, so as to provide further means of protecting the interior spaces of the couplings against the entrance of dust and at the same time to prevent escape of the lubricant.

In cases where the couplings are provided with spherical guides, such as 57, 57', 58', 66, springs such as 53, Figure 10, on the connected shafts, may be dispensed with.

If desired moreover, the springs can be provided with one transverse slot or recess only, in which case only one flange or annular rib is required in the casing or housing, for example, the flange or rib 11 and slots 20, Figure 1, may be used alone, the rib 16 and slots 21 being dispensed with. In such case, other means must be provided for securing the parts of the casing together, e. g. those shown in Figure 11.

My improved flexible coupling can be arranged to permit of the driven shaft being turned through a considerable angle, e. g. 20 degrees or more relatively to the driving shaft. The improved coupling is capable of readily absorbing shocks thus reducing the wear on the gears or other parts connected with the driving and the driven shafts. Moreover by using springs having convex lateral extensions at or near their centres, their strength is materially increased.

In some cases one of the flanged rings engaging the lateral slots in the springs can be made capable of sliding in an axial direction, for example, as shown at 21 in Figure 10, so as to prevent the springs 19, 19 being additionally stressed by pressure against the ribs 20, 21 during flexure under the driving stress.

I claim:

1. A flexible coupling for the transmission of power, of the kind wherein the two shafts to be coupled are provided with coupling members having corresponding series of axially extending peripheral channels, the said members being connected by means of a series of springs, each of which extends from a peripheral channel in one coupling member to a peripheral channel in the other coupling member, characterized in that the springs, which are separate from one another and are supported in a casing are provided in their longitudinal edges with transverse slots that engage with a limited amount of freedom with annular ribs arranged in the casing.

2. A constructional form of the coupling claimed in claim 1, wherein the annular ribs for engaging the slots in the springs are formed on rings secured in the casing.

3. A constructional form of the coupling claimed in claim 1, wherein the annular ribs engage the slots in the springs on the same sides thereof.

4. A constructional form of the coupling claimed in claim 1, wherein the annular ribs engage the slots in the springs at opposite sides thereof.

5. A constructional form of the coupling claimed in claim 1, wherein the springs have convex outer edges.

6. A constructional form of the coupling claimed in claim 1, wherein the casing is adapted to fit on to a cylindrical or other suitable surface on one of the coupling members, the casing simultaneously holding in position an abutment ring which engages one side of a ring bearing an annular rib, such ribbed ring engaging at its other side with an abutment on the coupling member.

7. A constructional form of the coupling as claimed in claim 1, characterized in that the inner part of the casing has a surface adapted to fit over a split ring arranged in a groove in a cylindrical surface on one of the coupling members, said split ring serving to retain in position the ring having an annular rib for engaging the transverse slots in the springs.

8. A constructional form of the coupling claimed in claim 1, wherein the one part of the casing has a conical surface adapted to depress the corresponding ends of the springs, so as to bring transverse slots in such springs into engagement with annular ribs in said housing.

9. A constructional form of the coupling claimed in claim 1, wherein the casing is made in a plurality of parts which are held together by the springs connecting the coupling members.

10. A constructional form of the coupling claimed in claim 1, wherein the casing is made in a plurality of parts which are held together by being secured to separate rings bearing the annular ribs that engage transverse slots in the springs, substantially as described.

11. A coupling as claimed in claim 1, wherein the transverse slots in the springs have flared sides.

12. A flexible coupling for the transmission of power, said coupling comprising coupling members each having an annular series of teeth with convex engaging surfaces, flat springs extending in an axial direction from the tooth spaces of one coupling member to the corresponding tooth spaces of the other coupling, an annular rib fixed on one coupling member and engaging with a limited amount of freedom in a transverse slot in a longitudinal edge of each of the springs, and means for limiting the radial movement of said springs.

13. A flexible coupling for the transmission of power, said coupling comprising coupling members each having an annular series of teeth with convex engaging surfaces, flat springs extending in an axial direction from the tooth spaces of one coupling member to the corresponding tooth spaces of the other coupling, an annular rib fixed on one coupling member and engaging with a limited amount of freedom in a transverse slot in a longitudinal edge of each of the springs, an annular rib mounted on the other coupling member so as to be movable axially thereon and engaging with a limited amount of freedom in a transverse slot in a longitudinal edge of each of the springs, and means for limiting the radial movement of the springs.

CHARLES ARTHUR GLENDOWER STANDAGE.